Feb. 27, 1951 R. H. RANGER 2,543,058

TRIGGERED FREQUENCY CONTROL

Filed March 9, 1945 4 Sheets-Sheet 1

INVENTOR
RICHARD H. RANGER

BY William D. Hall

ATTORNEY

Feb. 27, 1951 R. H. RANGER 2,543,058

TRIGGERED FREQUENCY CONTROL

Filed March 9, 1945 4 Sheets-Sheet 2

INVENTOR
RICHARD H. RANGER
BY William D. Hall
ATTORNEY

INVENTOR
RICHARD H. RANGER
BY William D. Hall.
ATTORNEY

Feb. 27, 1951 R. H. RANGER 2,543,058

TRIGGERED FREQUENCY CONTROL

Filed March 9, 1945 4 Sheets-Sheet 4

INVENTOR
RICHARD H. RANGER
BY William D. Hall.
ATTORNEY

Patented Feb. 27, 1951

2,543,058

UNITED STATES PATENT OFFICE 2,543,058

TRIGGERED FREQUENCY CONTROL

Richard H. Ranger, Newark, N. J.

Application March 9, 1945, Serial No. 581,814

14 Claims. (Cl. 250—36)

(Granted under the act of March 3, 1883, as amended April 30, 1928; 370 O. G. 757)

The invention described herein may be manufactured and used by or for the Government for governmental purposes, without the payment of any royalty thereon.

This invention relates to means for maintaining constant the frequency of an alternating current wave, or, in other words, for keeping the output frequency of an electric oscillator stable.

It is an object of my invention to maintain stability of an oscillator by controlling the reactance of an oscillator in opposite directions depending upon whether or not the frequency of the controlled oscillator is above or below the desired frequency.

It is a further object of my invention to secure this desirable frequency stability by adjusting the reactance of an oscillator by varying the permeability of the core of an electro-magnet.

The advantages of this invention are numerous and clear. The device employs only electronic tubes, reactances including inductors and capacitors, resistances and, as a modification, electromagnetic devices. The electric motors required by the prior art devices are dispensed with. This device is, therefore, cheaper to manufacture and more efficient in operation. By means of this invention it has been found possible to control relatively high frequency within a range of one cycle.

Other objects of my invention will be obvious and apparent from the annexed specification and drawings. At the end of the specification what I desire to claim as my invention is set forth.

Figure 1:
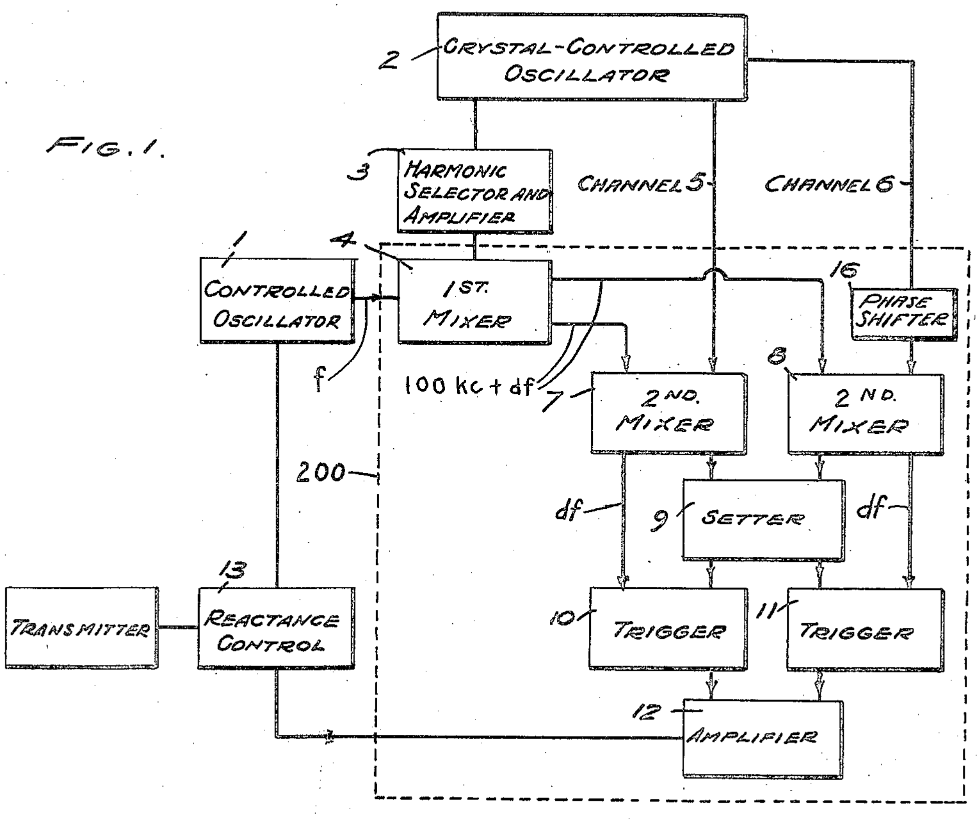
Fig. 1 is a block diagram showing the various parts of the frequency controller.

Referring now to Fig. 1, which is a general description of that modification of this device which has been selected from among others to illustrate this invention, there is disclosed a controlled oscillator 1 which is to furnish the desired frequency to be stabilized. A crystal-controlled oscillator 2 furnishes a relatively stable frequency which serves as a reference. As an example, crystal-controlled oscillator 2 may have an output frequency of 100 kc. In order that the oscillator 1 may be controlled at various frequencies there is provided a harmonic selector and amplifier 3. If the output frequency of oscillator 1 be designated *f*, the selector 3 will be set to that harmonic of oscillator 2 which is equal to *f* plus 100 kc. These two frequencies, that is to say, the output *f* from oscillator 1 and the output *f* plus 100 kc. from oscillator 2 and selector 3 are led to a first mixer 4. If the frequency of oscillator 1 is not exactly correct it will have a difference frequency *df* added to or subtracted from the desired frequency *f*. That is to say, the output frequency of oscillator 1 is *f* plus or minus *df*. The stable output frequency (100 kc.) of oscillator 2 is led through two channels 5 and 6 to a pair of second mixers 7 and 8. Channel 6 contains a device designated by 16 which operates to shift the phase 90° with respect to the phase of the unshifted output of oscillator 2. The frequency passing through channel 5 will, therefore, be 100 kc. at zero phase while that passing through channel 6 will be 100 kc. at plus 90° phase. The output from first mixer 4, which is 100 kc. plus or minus *df* (if any is present), is also led to the pair of second mixers 7 and 8. The frequency *f* is eliminated in the first mixer 4. In the second mixer 7, the 100 kc. frequency is eliminated so that the output from second mixer 7 is *df*. The operation of the second mixer 8 is similar except that its output is *df* at 90° phase. The outputs of second mixers 7 and 8 are fed to a setter tube (hereafter called the setter) 9 which is arranged so that its plate current will be at a minimum as long as the output potential of either mixer 7 or 8 is positive (that is, during the positive half of the cycle of the voltage wave). This minimum continues until output potentials of both 7 and 8 are out of the positive region. Current will then rise rapidly from the setter 9. This rapid rise is used to charge a capacitor 20 (shown in Fig. 2) forming a part of setter 9. A part of the outputs of second mixers 7 and 8 is led to trigger circuits 10 and 11 (hereafter called triggers). (Trigger tubes and circuits are well-known in the art of electronics.) Since these outputs differ in phase that which is first to reach the trigger 10 or 11 causes the trigger to discharge the capacitor 20 of setter 9 and to exhaust the charge of this capacitor so that there is no charge remaining on it when the output from the other second mixer 7 or 8 arrives. The output from the trigger 10 or 11 whichever is the first to fire is amplified at 12 and supplied to reactance control 13 by means of which the output frequency of oscillator 1 is adjusted. Depending upon whether the frequency (*f* plus or minus *df*) put out by oscillator 1 is above or below the reference frequency (*f* plus 100 kc.) supplied by oscillator 2 and selected at 3, the frequency (100 kc. plus or minus *df*), if any, put out by first mixer 4 will be above or below the desired frequency. In other words, if the frequency selected at 3 ($f$ plus 100 kc.) be thought of as the reference point, the difference frequency ($df$) will be ahead or behind it in time, or may be thought of as being leading or lagging with regard to it. When the frequency (100 kc. plus or minus $df$) is mixed in the pair of second mixers 7 and 8 with the reference frequency 100 kc. at zero phase and 100 kc. at plus 90° the 100 kc. is eliminated but this phase difference is maintained in the output frequency from the second mixers 7 and 8. But the output from second mixer 7 leads or lags that from second mixer 8 depending upon whether the output frequency $f$ from controlled oscillator 1 is above or below the desired frequency.

Figure 3:
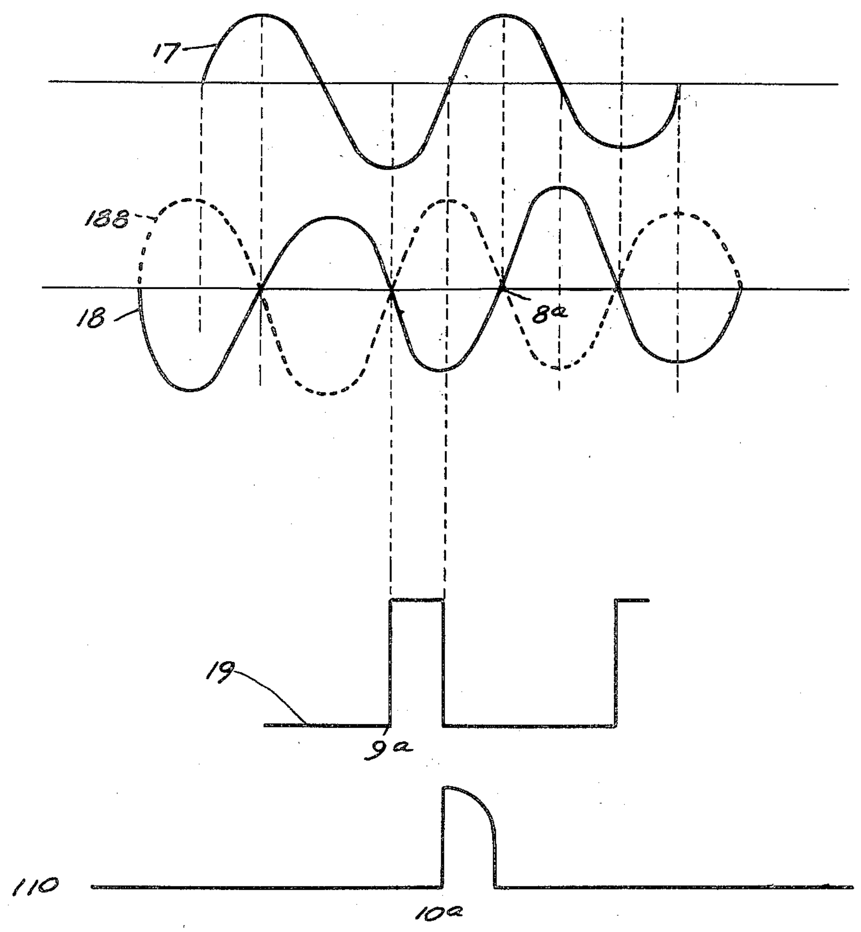
Fig. 3 is a diagrammatic showing of certain curves representing wave forms useful in illustrating this invention.

For the purpose of illustrating this shift in phase which occurs when the controlled frequency $f$ is above or below the desired frequency, Fig. 3 shows, in full lines, wave form 17 and 18 which are diagrammatic representations of the low frequency or output beats $df$ coming from second mixers 7 and 8. These output frequencies may be anything from zero cycles to 5,000 cycles plus or minus. When the output frequencies ($df$) of the second mixers 7 and 8 are as shown in the full lines in Fig. 3 the frequency of oscillator 1 is below the correct frequency. If the output frequency from controlled oscillator 1 is above the correct frequency the output of second mixer 8 will be behind that of second mixer 7. This is shown by the dotted line 188 in Fig. 3. This showing indicates the 180° reversal which takes place if the output of controlled oscillator 1 shifts from being below the desired frequency to being above the desired frequency. In Fig. 3 the square wave 19 illustrates the output from setter 9. Limiting amplifiers are used to give this square wave 19. When both of the full line waves 17 and 18 are negative, a pulse is formed in square wave 19 as illustrated at 9$a$. This pulse represents the rapid rise in the plate current of the tube in setter 9. Line 110 represents the discharge from the condenser 20 forming a part of setter 9 and illustrates first that as the pulse 9$a$ occurs this condenser is charged and rapidly discharged by the first trigger 10 or 11 to fire.

Figure 2:
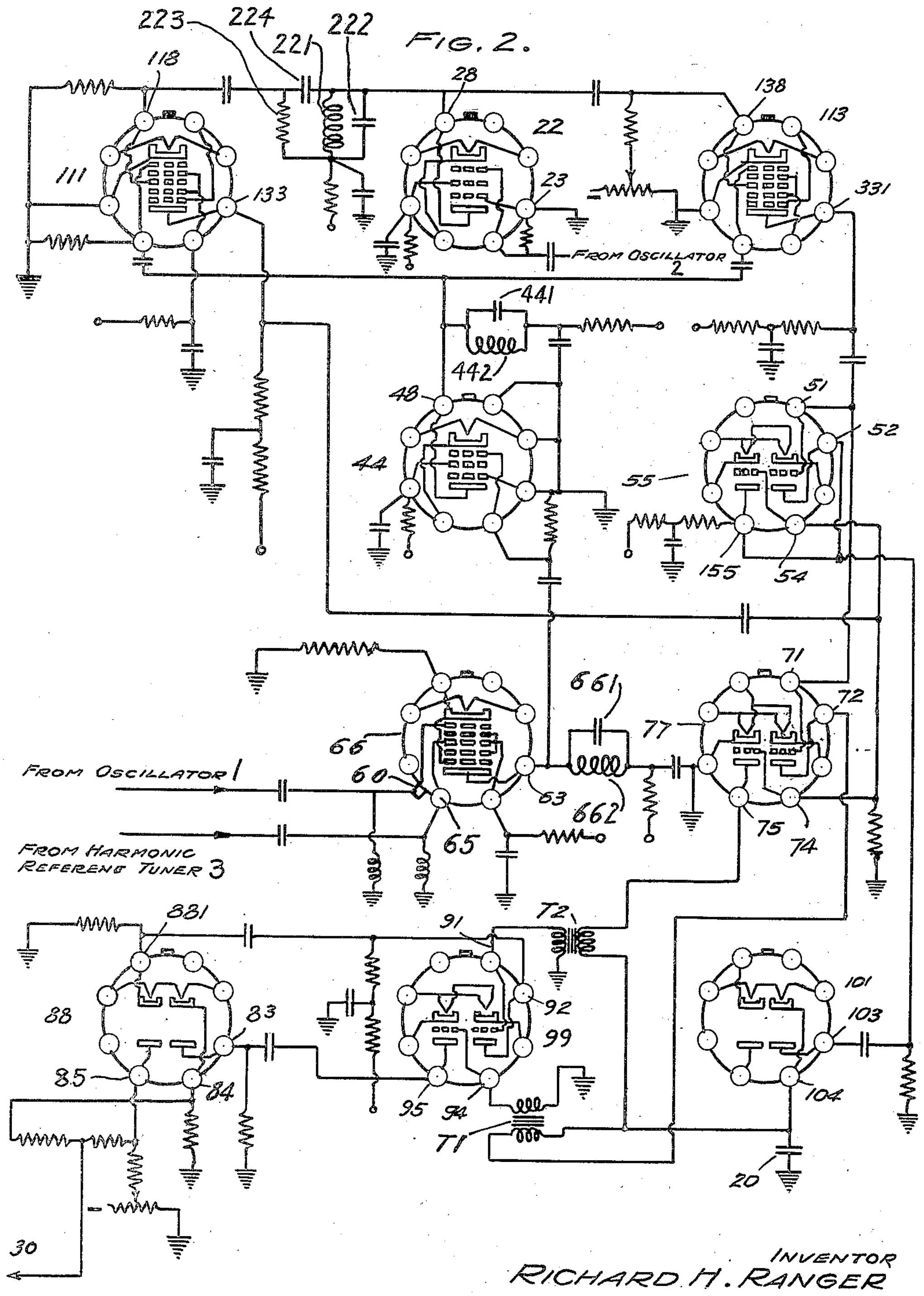
Fig. 2 is an electric circuit and tube diagram of those parts of the device included within the dotted square 200 of Fig. 1.

Fig. 2 is a detailed showing of the elements included within the larger square 200 shown in dotted lines in Fig. 1. The output $f$ from oscillator 1 is led to a grid 60 of tube 66 (which, together with amplifier tube 44, is included in first mixer 4 of Fig. 1). The output from the harmonic reference tuner or selector 3 is led to another grid 65 of tube 66. The plate output current from tube 66 is taken off at 63 and led to a parallel resonant circuit composed of a 2.5 millihenry (mh.) reactance 662 tuned with an 850 micromicrofarad (mumuf.) capacitor 661. This is for use with a 100 kc. frequency. This tuning is not critical. Tube 66 feeds tube 44 which has a similar tuned coupling in its plate output 48. This tuned coupling comprises capacitor 441 and reactance 442. The output of tube 44 is split and led to tubes 111 and 113 (which correspond to second mixers 7 and 8, respectively).

The direct 100 kc. output from oscillator 2 is led to grid 23 of amplifier tube 22. From the plate output 28 it is divided and led to grids 118 and 138 of tubes 111 and 113 respectively (through circuits which corresponds to channels 5 and 6, respectively, of Fig. 1.) Connected between the tubes 111 and 22 is a resonant circuit comprising a 2.5 mh. reactance 221 and an 850 mumuf. capacitor 222. Across this parallel resonant circuit a 15 ohm resistance 223 and a 100 mumuf. capacitor 224 are connected in series. (Reactance 221, resistance 223 and capacitors 222 and 224 comprise a phase-shifting circuit, which corresponds to phase shifter 16 of Fig. 1.) This causes tube 111 to be fed with a 100 kc. energy at zero phase as compared with the 100 kc. energy fed at plus 90° phase to tube 113. The net result is the displacement in phase of the 100 kc. output fed through channels 5 and 6 to second mixers 7 and 8. The output frequency $df$, if any, from tube 111 is led to the grids 54 and 74 of tubes 55 and 77 respectively (which correspond to triggers 10 and 11, respectively, of Fig. 1.) Likewise, the output from plate 331 of tube 113 is led to grids 51 and 71 of tubes 55 and 77 respectively. The plate outputs 52 and 155 of tube 55 are combined and led to plate 103 of tube 101 (which corresponds to setter 9 of Fig. 1.) Cathode 104 of tube 101 has a 0.001 muf. capacitor 20 connected thereto. Capacitor 20 is connected to a parallel circuit one branch of which contains a primary coil of transformer $T_1$ and the plate 72 of tube 77 in series. The other branch contains a primary coil of transformer $T_2$ and the plate 75 of tube 77 connected in series. The secondary coils of transformers $T_1$ and $T_2$ are connected to the grids 91 and 94 respectively of tube 99 (which, together with rectifier tube 88, is included in amplifier 12 of Fig. 1.) The plates 92 and 95 of tube 99 are respectively connected to the cathode 881 and to the plate 83 of tube 88. Tube 88 rectifies the output from tube 99. Cathode 84 and plate 85 of tube 88 are connected to a terminal 30 which leads to the reactance control shown in Fig. 4.

Figures 4, 7:
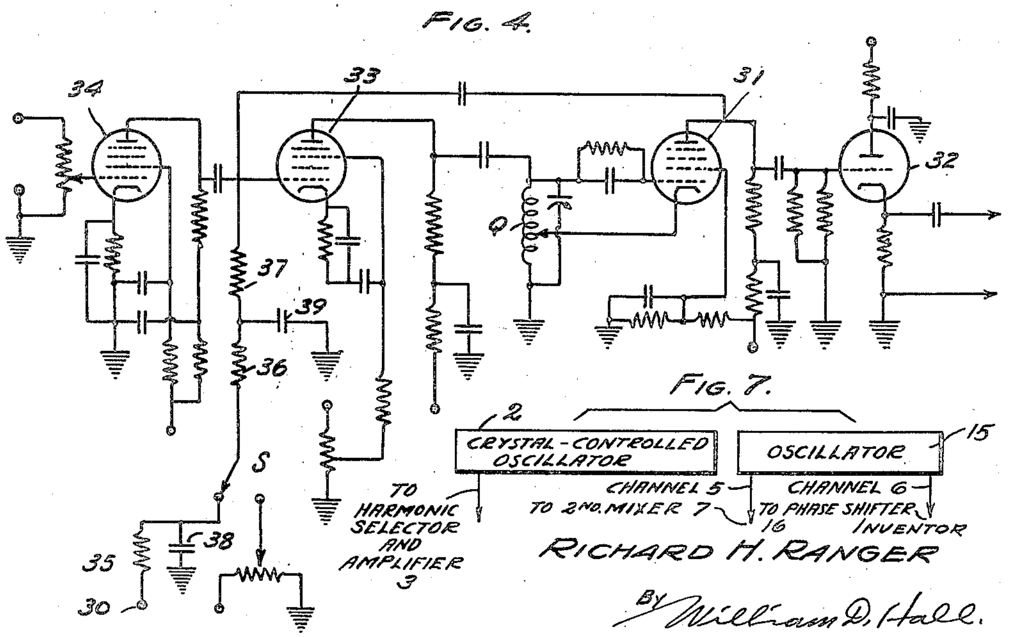
Fig. 4 is an electrical circuit and tube diagram showing the reactance control designated as block 13 in Fig. 1.
Fig. 7 shows a modification of a portion of Fig. 1.

In Fig. 4 is shown a conventional reactance modulated frequency modulated transmitter oscillator. From the circuit already described current is led in at terminal 30 through resistors 35, 36 and 37 to a grid of tube 33. Capacitor 38 and 39 are connected from this circuit to ground. Switch S provides a means of effecting manual control of reactance modulated tube 33 in place of the automatic frequency control already described. Tube 31 is an oscillator tube driving a cathode follower tube 32 which in turn will drive the main transmitter amplifier. Tube 33 is the conventional reactance modulator to affect the frequency of tube 31. Tube 34 is the normal microphone amplifier which in turn controls the effectiveness of tube 33 as a reactance on oscillator tube 31. This is done by swinging the voltage applied to the grid of tube 33. The other elements of Fig. 4 which are not described are also conventional.

Fig. 7 shows a modification of a portion of Fig. 1 and is labeled to show the manner in which this modification is joined to the remainder of Fig. 1. A straight oscillator 15 may be applied here having an output frequency extending from 100 to 200 kc. and feeding directly channels 5 and 6. The connections from crystal controlled oscillator 2 to channels 5 and 6 are dispensed with. By means of oscillator 15 a continuous variation of 100 to 200 kc. may be used for the second reference. Thereby, the controlled oscillator 1 may be stabilized at any point within the range from 100 to 200 kc., away from the harmonic selected at 3. Therefore, continuous frequency control may be established at any point from one harmonic selected at 3 to the next. This reference frequency will be that of oscillator 15 which should be very good as it is at comparatively low frequency.

Figure 5:
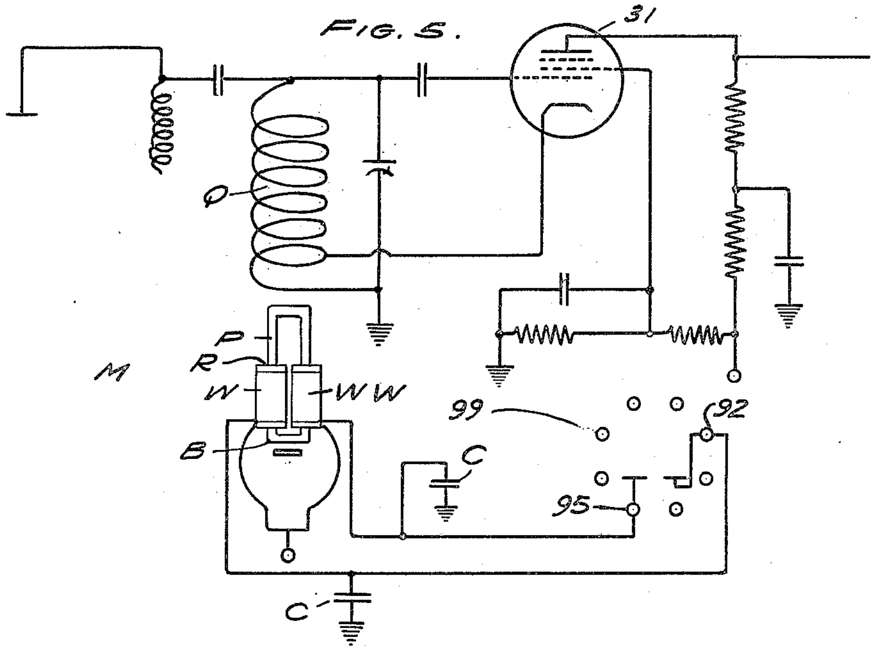
Fig. 5 is a circuit and tube diagram showing a portion of the circuit containing a modification.
Figure 6:
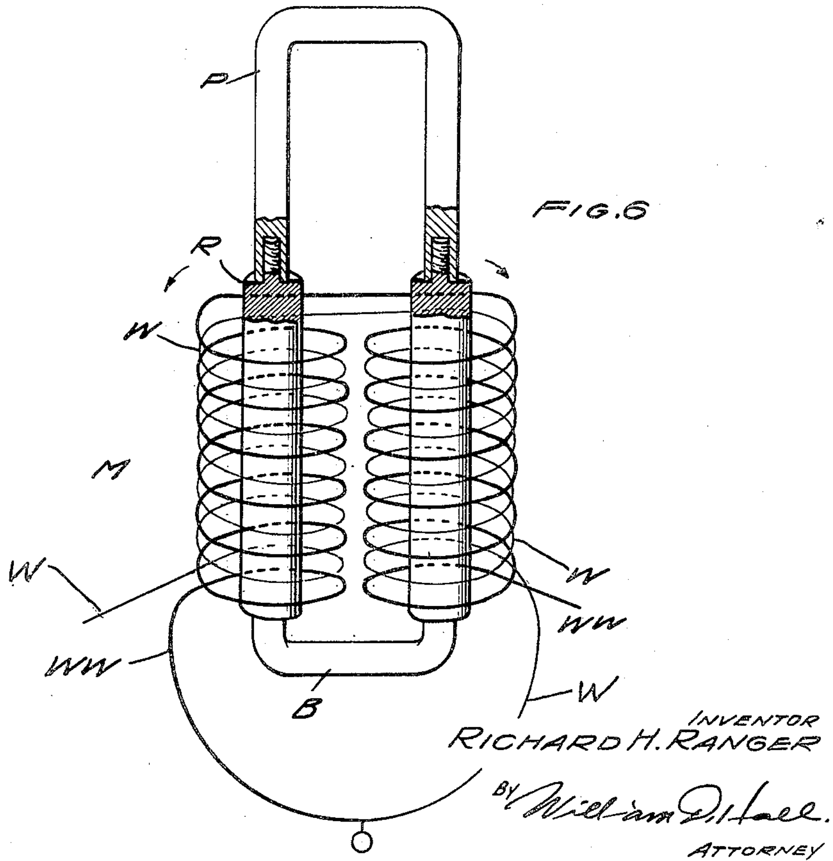
Fig. 6 is a diagrammatic and schematic showing (with portions broken away in vertical cross section) of the electro-magnet and associated structure which are a part of the modification shown in Fig. 5.

In Figs. 5 and 6 there is disclosed a modification of my invention in which the output frequency of oscillator 1 is maintained constant by the use of magnetism. This is done in the following manner: Pulses, which vary in direction depending upon whether or not the frequency of oscillator 1 is above or below the desired frequency, are passed through one or another of two coils. The coil which is energized serves to increase or decrease the magnetization of a ferrous core. This core affects the reactance of a second coil which also surrounds it, this coil in turn controlling the reactance of the oscillator.

Fig. 5 shows a portion of the circuit shown in Figs. 2 and 4 as modified to provide this magnetic control. The manner in which the circuit of Fig. 5 would be connected with the circuit of Fig. 2 is evident from the fact that tube 99 is shown in both of these figures. Those parts of Fig. 5 which are not described below are conventional. The pulses (see page 4, lines 20 through 24), which vary in direction depending upon whether the frequency of oscillator 1 is above or below the desired frequency, are applied to the plates 92 and 95 of tube 99. Depending upon which of these plates is energized, a current passes through a coil W or WW of the magnetic controller generally designated at M. These coils are wound about cores R which are made of ordinary Swedish iron, which has a good measure of magnetic retension in it. Cores R are connected at their upper ends to a slug P made of very high permeability, low retentivity material such as pressed powdered iron. Slug P is located within the turns of a coil Q connected in the grid-to-cathode circuit of controlled oscillator tube 31. A small permanent magnet B forms a yoke at the bottom of cores R to provide a minimum magnetic bias. Condensers C prevent too rapid frequency fluctuation.

The operation of this modification is as follows (see Fig. 6): Assume that a pulse from plate 95 passes through coil WW, shown in heavy lines. This increases the residual magnetization of cores R and magnetizes the slug P. This magnetization of slug P affects the radio reactance of coil Q in one direction, for example, to increase the frequency of the oscillator tube 1 and to bring it to the desired frequency. If, however, plate 92 is energized, current is conducted through coil W shown in light lines. This coil has a different number of turns carried in the opposite direction to the turns of coil WW. Coil W, therefore, affects the residual magnetization of cores R and causes magnetization of slug P in the opposite magnetic polarity to that caused by current through coil WW. Therefore, the radio frequency reactance of coil Q is affected in the opposite direction to that previously mentioned and causes the frequency of tube 31 to return to the desired frequency at which it is to be controlled.

I claim:

1. A frequency control device comprising, a controlled oscillator whose frequency is to be stabilized, a reference oscillator whose frequency serves as a standard, a first mixer connected to said oscillators and in which at least a portion of the outputs of said oscillators are combined to produce an output containing any difference between the frequencies of these outputs, a plurality of channels connected to said reference oscillator so as each to receive a portion of the output frequency thereof, a phase shifter in one of said channels to cause a variation between the phases of the energy passing through said channels, a plurality of second mixers each connected to one of said channels and all connected to said first mixer so as to receive the outputs thereof and so as to each give an output equal in frequency to any difference between the outputs of said controlled oscillator and of said reference oscillator, the outputs of said second mixers differing in phase, means connected to said second mixers to store a relatively small portion of the output thereof, a plurality of trigger devices each connected to one of said second mixers and to said means and adapted to discharge said means substantially completely depending upon which said trigger device is first energized by the output from one of said second mixers, and a reactance control connected to said trigger devices and to said controlled oscillator and adapted to correct the frequency of said controlled oscillator.

2. A method of producing an alternating electric current of substantially constant frequency comprising, generating a first electric wave whose frequency is controlled, generating a second electric wave whose frequency serves as a standard, mixing said first electric wave with said second electric wave producing components leading or lagging the other in phase depending upon whether the frequency of said first wave is greater or less than that of said second wave, mixing said second wave with said components thereby producing third waves whose frequency is equal to any difference between the first wave and the components of said second wave and retaining the same difference in phase, storing energy from said third waves, releasing said stored energy completely by that one of said third waves which is leading in phase, and utilizing said released energy at the frequency of said third waves to adjust the frequency of said first wave to equal that of said second wave.

3. A method of producing an alternating electric current of substantially constant frequency comprising, generating a first electric wave whose frequency is controlled, generating a second electric wave whose frequency serves as a standard, combining said first and second electric waves to produce wave components, one of said components leading or lagging the other in phase depending upon whether the frequency of said first wave is greater or less than that of said second wave, mixing said second wave with said components thereby producing two third waves whose frequency is equal to any difference between said first wave and the components of said second wave and retaining the same difference in phase supplying each of said third waves to a winding of a magnetic circuit element, utilizing the frequency of only that one of said third waves which is leading in phase to vary the magnetization of a circuit element, and causing said change in magnetization to vary the reactance of the generator of said first wave and to thereby adjust the frequency of said first wave to that of said second wave.

4. A frequency control device comprising, a controlled oscillator whose frequency is to be stabilized, a reference oscillator whose frequency serves as a standard, a first mixer connected to said oscillators and in which at least a portion of the outputs of said oscillators are combined to produce an output containing any difference between the frequencies of these outputs, a plurality of electric channels connected to said reference oscillator so as each to receive a portion of the output frequency thereof, a phase shifter in one of said channels to cause a variation between the phases of the energy passing through said channels, a plurality of separate connecting means each connected to one of said electric channels and all connected to said first mixer so as to receive the outputs thereof and arranged so that the energy passing therethrough varies in phase depending upon the frequency relations between said oscillators, and means comprising a plurality of triggering devices actuated by that energy which is leading in phase and which, in turn, changes the frequency of said controlled oscillator into equality with the frequency of said reference oscillator.

5. A frequency control device comprising, a controlled oscillator whose frequency is to be stabilized, a reference oscillator whose frequency serves as a standard, a first mixer connected to said oscillators and in which at least a portion of the outputs of said oscillators are combined to produce an output containing any difference between the frequencies of these outputs, a plurality of electric channels connected to said reference oscillator so as each to receive a portion of the output frequency thereof, a phase shifter in one of said channels to cause a variation between the phases of the energy passing through said channels, a plurality of separate connecting means each connected to one of said electric channels and all connected to said first mixer so as to receive the outputs thereof and arranged so that the energy passing therethrough varies in phase depending upon the frequency relations between said oscillators, vacuum tubes containing at least three electrodes therein and each connected in one of said connecting means so as to pass energy therethrough, and a reactance controller connected under the control of said vacuum tubes and arranged to change the frequency of said controlled oscillator into equality with the frequency of said reference oscillator when said reactance controller is energized by energy passed by one of said vacuum tubes.

6. A frequency control device comprising, a controlled oscillator whose frequency is to be stabilized, a reference oscillator whose frequency serves as a standard, a first mixer connected to said oscillators and in which at least a portion of the outputs of said oscillators are combined to produce an output containing any difference between the frequencies of these outputs, a plurality of electric channels connected to said reference oscillator so as each to receive a portion of the output frequency thereof, a phase shifter in one of said channels to cause a variation between the phases of the energy passing through said channels, a plurality of separate connecting means each connected to one of said electric channels and all connected to said first mixer so as to receive the outputs thereof and arranged so that the energy passing therethrough varies in phase depending upon the frequency relations between said oscillators, a plurality of first vacuum tubes each having at least three electrodes therein connected in said connecting means so as control the passage of energy therethrough, a plurality of second vacuum tubes each having at least three electrodes therein and each connected in circuit with the output of one of said first vacuum tubes and arranged to pass energy through one of said second tubes when said second tube is energized by energy from one of said first vacuum tubes, and a reactance controller connected to said second vacuum tubes and arranged when energized by energy passing through one of said vacuum tubes to correct the frequency of said controlled oscillator.

7. A frequency control device comprising, a controlled oscillator whose frequency is to be stabilized, a reference oscillator whose frequency serves as a standard, a vacuum tube having at least three electrodes therein and connected to receive at least a portion of the outputs of said oscillators and to combine said outputs to produce an output frequency equal to any difference between the frequencies of the outputs of said oscillators, a plurality of electric channels connected to said reference oscillator so as each to receive a portion of the output frequency thereof, a phase shifter in one of said channels to cause a variation between the phases of the energy passing through said channels, a plurality of separate connecting means each connected to one of said electric channels and all connected to said vacuum tube so as to receive the outputs thereof and arranged so that the energy passing therethrough varies in phase depending upon the frequency relations between said oscillators, and control phase selective means including a plurality of triggering devices actuated by that energy which is leading in phase and which, in turn, changes the frequency of said controlled oscillator into equality with the frequency of said reference oscillator.

8. A frequency control device comprising, a controlled oscillator whose frequency is to be stabilized, a reference oscillator whose frequency serves as a standard, a first mixer connected to said oscillators and in which at least a portion of the outputs of said oscillators are combined to produce an output containing any difference between the frequencies of these outputs, a plurality of channels connected to said reference oscillator so as each to receive a portion of the output frequency thereof, a phase shifter in one of said channels to cause a variation between the phases of the energy passing through said channels, a plurality of vacuum tubes each containing at least a cathode, a grid and an anode therein and each connected to one of said electric circuits and all connected to said first mixer so as to receive the outputs thereof and so as to each give an output equal in frequency to any difference between the outputs of said controlled oscillator and of said reference oscillator, the outputs of said vacuum tubes differing in phase, a plurality of said separate connecting means each connected to one of said vacuum tubes and all connected to said first mixer so as to receive the outputs of said first mixer and of said vacuum tubes and arranged so that the energy passing therethrough varies in phase depending upon the frequency relations between said oscillators, and means including a plurality of triggering devices responsive to that energy which is first to reach one of said devices and which, in turn, changes the frequency of said controlled oscillator into equality with the frequency of said reference oscillator.

9. A frequency control device comprising, a controlled oscillator whose frequency is to be stabilized, a reference oscillator whose frequency serves as a standard, a first mixer connected to said oscillators and in which at least a portion of the outputs of said oscillators are combined to produce an output containing any difference between the frequencies of these outputs, a plurality of electric channels connected to said reference oscillator so as each to receive a portion of the output frequency thereof, a phase shifter in one of said channels to cause a variation between the phases of the energy passing through said channels, a plurality of second mixers each connected to one of said electric channels and all connected to said first mixer so as to receive the outputs thereof and so as to each give an output equal in frequency to any difference between the outputs of said controlled oscillator and of said reference oscillator, the outputs of said second mixers differing in phase, a setter deriving energy from the second mixers, said setter having its plate current at a minimum during the positive half of the cycle of the voltage wave of the output of any of the second mixers, a condenser connected to said setter, a plurality of vacuum tubes each containing at least three electrodes therein and having their plates connected to said condenser, each of said vacuum tubes deriving energy from one of the second mixers, and a reactance control actuated by that energy which is leading in phase and which is discharged from said condenser by one of said vacuum tubes, said reactance control utilizing said energy to change the frequency of said controlled oscillator to equal the frequency of said reference oscillator.

10. A frequency control device comprising, a controlled oscillator whose frequency is to be stabilized, a reference oscillator whose frequency serves as a standard, a first mixer connected to said oscillators and in which at least a portion of the outputs of said oscillators are combined to produce an output containing any difference between the frequencies of these outputs, a plurality of electric channels connected to said reference oscillator so as each to receive a portion of the output frequency thereof, a phase shifter in one of said channels to cause a variation between the phases of the energy passing through said channels, a plurality of second mixers each connected to one of said electric circuits and all connected to said first mixer so as to receive the outputs thereof and so as to each give an output equal in frequency to any difference between the outputs of said controlled oscillator and of said reference oscillator, the outputs of said second mixers differing in phase, a plurality of vacuum tubes each having at least three electrodes therein and having their grids connected to receive the outputs of said second mixers, a diode connected between the plates of two of said vacuum tubes and arranged to pass energy from the plate of one of said vacuum tubes to the plate of another of said vacuum tubes, depending upon which of said vacuum tubes is energized by the energy leading in phase, and a reactance control connected under the control of the plate current of two of said vacuum tubes and arranged to be actuated by that plate current which is leading in phase so as to change the frequency of said controlled oscillator into equality with the frequency of said reference oscillator.

11. A frequency control device, as described in claim 1, in which the reactance control includes: a magnetic core made up of material of high permeability and low retentivity; a plurality of windings surrounding the core; means for supplying to each winding energy from one of the trigger devices, and a reactance coil forming part of a frequency-adjusting circuit of the controlled oscillator, this coil surrounding a portion of the magnetic core, and the reactance of this coil being affected by the degree of magnetization of the core.

12. A frequency control device, as described in claim 7, in which the control means include: a magnetic core made up of material of high permeability and low retentivity; a plurality of windings surrounding the core; means for supplying to each winding energy from one of the connecting means, and a reactance coil forming part of a frequency-adjusting circuit of the controlled oscillator, this coil surrounding a portion of the magnetic core, and the reactance of this coil being affected by the degree of magnetization of the core.

13. A frequency control device, as described in claim 9, in which the reactance control includes: a magnetic core made up of material of high permeability and low retentivity; a plurality of windings surrounding the core; means for supplying to each winding energy from one of said vacuum tubes, and a reactance coil forming part of a frequency-adjusting circuit of the controlled oscillator, this coil surrounding a portion of the magnetic core, and the reactance of this coil being affected by the degree of magnetization of the core.

14. A frequency control device comprising, a controlled oscillator whose frequency is to be stabilized, a crystal-controlled oscillator whose frequency serves as a standard, a first mixer connected to said oscillators and in which at least a portion of the outputs of said oscillators are combined to produce an output containing any difference between the frequencies of these outputs, a plurality of electric channels connected to said crystal-controlled oscillator so as each to receive a portion of the output frequency thereof, a phase shifter in one of said channels to cause a variation between the phases of the energy passing through said channels, a plurality of connecting means including means for storing a portion of said energy, and a plurality of triggering devices adapted to discharge said means for storing depending upon which trigger device is first energized; each of said connecting means connected to one of said electric channels and all connected to said first mixer so as to receive the outputs thereof and so as to each give an output equal in frequency to any difference between the outputs of said controlled oscillator and of said crystal-controlled oscillator, the outputs of said connecting means differing in phase depending upon the frequency relations between said oscillators, a diode connected to said connecting means so as to receive and pass energy from one of said triggering devices which is actuated by that energy leading in phase, and a reactance control connected under the control of said diode and arranged to correct the frequency of the controlled oscillator to equal that of said crystal-controlled oscillator by means of the energy passed by said diode.

RICHARD H. RANGER.

REFERENCES CITED

The following references are of record in the file of this patent:

UNITED STATES PATENTS

| Number | Name | Date |
|---|---|---|
| 1,931,873 | Morrison | Oct. 24, 1933 |
| 1,788,533 | Morrison | Jan. 13, 1931 |
| 1,942,602 | Hyland | Jan. 9, 1934 |
| 2,018,820 | Usselman | Oct. 29, 1935 |
| 2,058,114 | Usselman | Oct. 20, 1936 |
| 2,104,801 | Hansell | Jan. 11, 1938 |
| 2,221,517 | Holters | Nov. 12, 1940 |
| 2,250,284 | Wendt | July 22, 1941 |